United States Patent [19]

Moriguchi

[11] Patent Number: 4,471,282
[45] Date of Patent: Sep. 11, 1984

[54] STEP MOTOR EXCITATION SYSTEM
[75] Inventor: Fujio Moriguchi, Kanagawa, Japan
[73] Assignee: Fuji Xerox Co., Ltd., Tokyo, Japan
[21] Appl. No.: 413,116
[22] Filed: Apr. 30, 1982
[30] Foreign Application Priority Data Sep. 4, 1981 [JP] Japan ............................... 56-138620

[51] Int. Cl.³ .......................................... H02K 29/04
[52] U.S. Cl. .................................... 318/696; 318/685
[58] Field of Search ................ 318/811, 685, 696, 341

[56] References Cited
PUBLICATIONS

R. A. McSparran, "Stepping Motor Control", IBM Technical Disclosure Bulletin, vol. 16, No. 9, Feb. 1974, p. 2859.

Primary Examiner—B. Dobeck
Assistant Examiner—Saul M. Bergmann
Attorney, Agent, or Firm—Sughrue, Mion, Zinn, Macpeak & Seas

[57] ABSTRACT

A step motor provided with a plurality of coils and driven in a one-two phase excitation mode is provided with a current setting device by which the current flowing in the coils is changed when switching from one to two phase excitation, to linearize the time dependence of the rotation angle of the motor.

9 Claims, 14 Drawing Figures

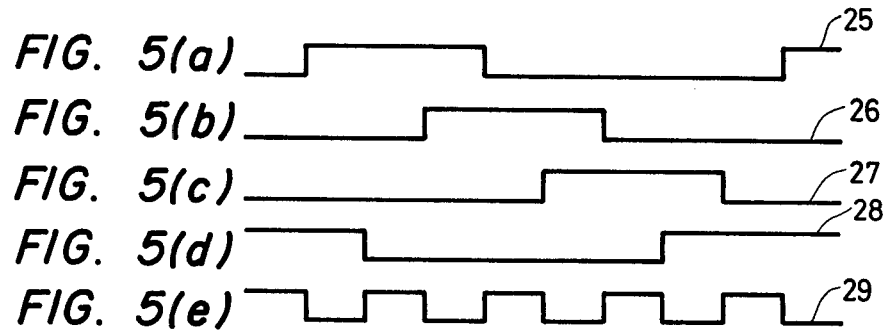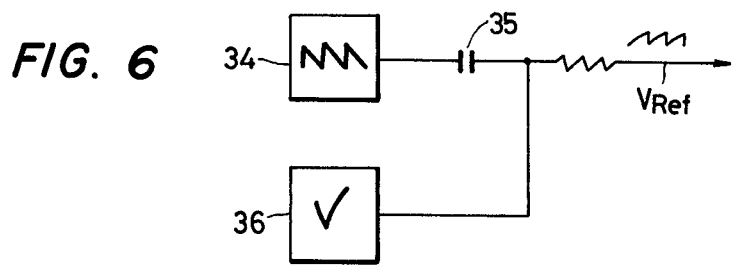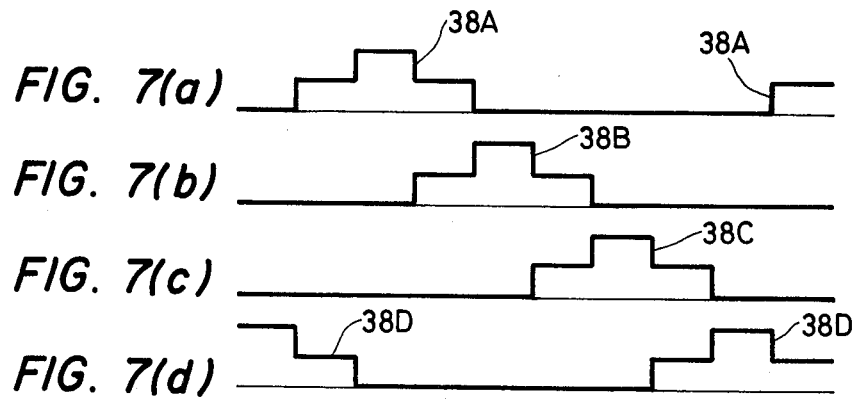

STEP MOTOR EXCITATION SYSTEM

BACKGROUND OF THE INVENTION

This invention relates to a system for exciting a step motor which is rotated in response to input signals.

Step motors are high in rotational angle control accuracy, and can be operated in an open loop control which requires no feedback. Therefore, they are extensively employed as driving sources for various mechanisms. In driving the step motor, for every stepping operation thereof it is necessary to obtain a torque which is sufficient for the given inertial moment. Especially when a high speed drive is required, the torque must be considerably high.

FIG. 1 shows a drive circuit according to a conventional chopper excitation system for driving a step motor at high speed. The circuit is connected to the four-phase exciting coils 1A, 2A, 1B and 2B of the step motor. First ends of the exciting coils 1A and 2A are connected, through the emitter and collector of a chopper transistor 3A adapted to control the supply of exciting current, to a power source line 4. The other ends of the exciting coils 1A and 2A are grounded through the collectors and emitters of transistors 5A and 6A, adapted to excite these coils, and through a current detecting resistor 7A for detecting excitation currents flowing in the exciting coils 1A and 2A. One terminal of the current detecting resistor 7A and an input terminal 8A, for inputting a reference voltage $V_R$, are connected to the input terminals of a comparator 9A, respectively. The output terminal of the comparator 9A, which is adapted to output a comparison result, is connected to the base of the chopper transistor 3A.

The arrangement of circuit elements for exciting the remaining exciting coils 1B and 2B is similar to that for exciting the coils 1A and 2A. Therefore, the circuit elements for the exciting coils 1B and 2B are designated by corresponding reference numerals with the suffix character "B", with the preceding description being applicable.

In the drive circuit thus organized, control signals are applied to the bases of the transistors 5A, 6A, 5B and 6B, to render these transistors conductive with predetermined timing. When the transistors 5A, 6A, 5B and 6B are selectively rendered conductive by the control signals, the coils 1A, 2A, 1B and 2B are excited, respectively. In the initial exciting operation of each of the coils 1A, 2A, 1B and 2B, the voltage drop across the current detecting resistor 7A or 7B due to the exciting current is small. Accordingly, in this case, the voltage $V_O$ supplied to the comparator 9A, or 9B is low, and the chopper transistor 3A or 3B is maintained conductive. In the drive circuit, a relatively high voltage is applied to the chopper transistors 3A and 3B through the power source line. Accordingly, in the initial state as described above, the exciting current is increased quickly. As the exciting current is increased, the voltage drop across the current detecting resistor 7A or 7B is increased, and accordingly the voltage $V_O$ is increased. When the voltage $V_O$ reaches the reference voltage $V_R$, the corresponding chopper transistor 3A or 3B is rendered nonconductive. Thereafter, on-off operation of the chopper transistor 3A or 3B is repeatedly carried out according to the relationship between the voltage $V_O$ and the reference voltage $V_R$, so that the operations of the exciting coils are controlled in a constant current mode.

Thus, according to the conventional step motor exciting system, the currents of the exciting coils are allowed to rise quickly. Therefore, a torque high enough to drive the step motor at high speed can be provided.

In the case where the step motor is driven by one-two phase excitation according to the above-described system, when two phases are excited simultaneously, the exciting current flowing in each exciting coil is two times that flowing in each exciting coil when one phase is solely excited. Accordingly, the magnetic energy which is produced in the step motor with one-phase excitation is much different from that which is produced in the step motor with two-phase excitation. Thus, in this case, the torque is nonuniform. Especially, where a load is applied to the step motor, the characteristic of the rotation angle with time is not linear as shown in FIG. 2, because the rotor rotation angle at every pulse signal supply period $T_1$ become $\theta_2$ in two-phase excitation, which is larger than $\theta_1$, which is the rotor rotation angle with one-phase excitation. Accordingly, if the above-described system is employed with the step motor of an original reading mechanism as used, for instance, in a facsimile device, the scanning lines are irregularly spaced, with the result that the resultant image data are not correct.

SUMMARY OF THE INVENTION

In view of the foregoing, an object of the invention is to provide a step motor excitation system in which, when performing one-two phase excitation in a system exciting the exciting coils according to a constant current control system, torque is uniformly generated irrespective of the number of excitation phases.

The foregoing object of the invention has been achieved by the provision of a step motor excitation system in which, according to the invention, a constant current control means for maintaining the maximum value of the exciting current flowing in each exciting coil at a predetermined value and a current value setting means for changing the predetermined value in two steps according to one-phase and two-phase excitations are used to separately change the exciting current according to the one-phase and two-phase excitations, to thereby made uniform the magnetic energy produced in the step motor.

BRIEF DESCRIPTION OF THE DRAWINGS

FIGS. 5a–5e are waveform diagrams showing various control signals output by the control circuit;

FIG. 6 is a block diagram showing a reference voltage generating circuit for forming the reference voltage supplied to the comparators; and FIGS. 7a–7d are explanatory diagrams indicating the time variations of the exciting currents flowing in the exciting coils of the step motor driven by one-two phase excitation.

DETAILED DESCRIPTION OF THE PREFERRED EMBODIMENTS

Figure 1:
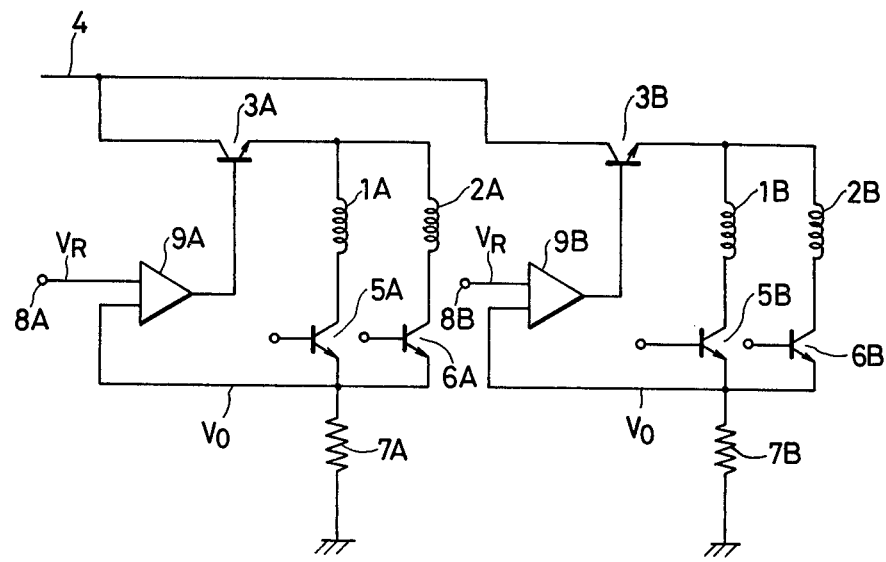
FIG. 1 is a circuit diagram showing a drive circuit for a step motor employing a conventional chopper excitation system.
Figure 2:
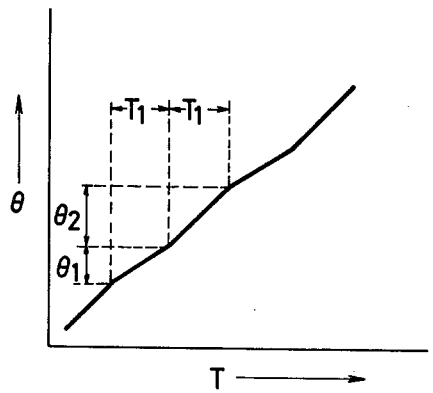
FIG. 2 is a characteristic diagram showing the rotation characteristic of a step motor driven by the drive circuit shown in FIG. 1.
Figure 3:
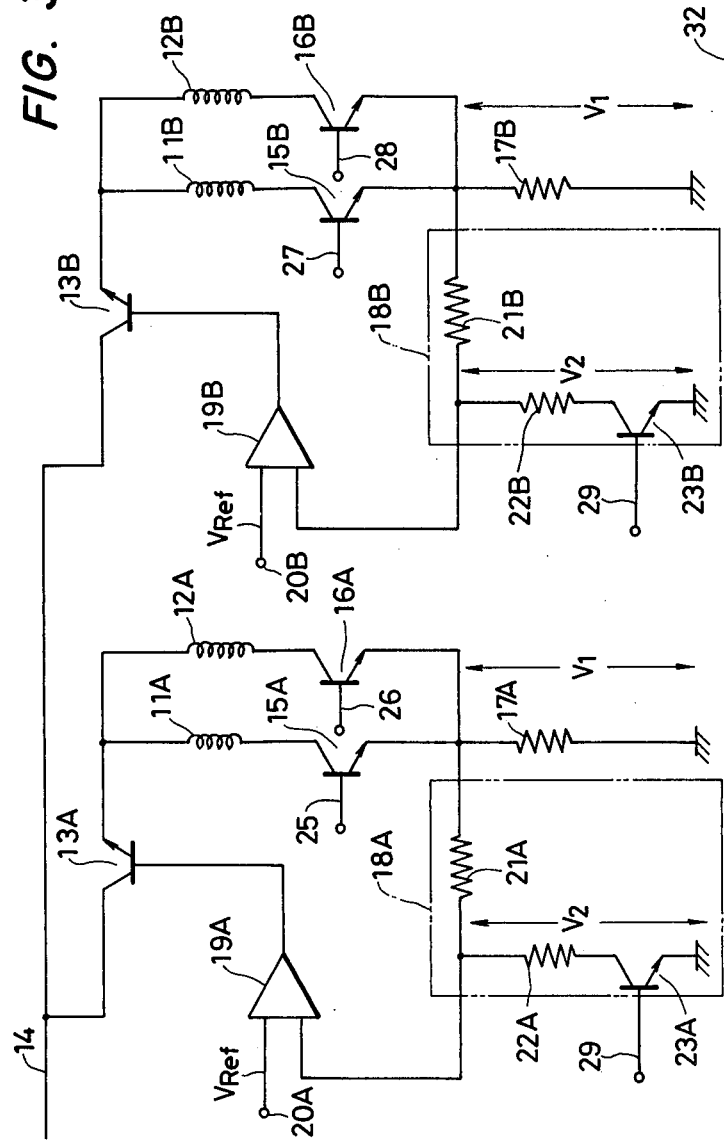
FIG. 3 is a circuit diagram showing the essential circuit elements of a drive circuit for a step motor according to the invention.

FIG. 3 shows a drive circuit for a unipolar four-phase step motor employing an excitation system according to this invention. The drive circuit is connected to four-phase exciting coils 11A, 12A, 11B and 12B of the step motor. First ends of the A phase exciting coil 11A and the $\overline{A}$ phase exciting coil 12A are connected, through the emitter and collector of a chopper transistor 13A adapted to control the supply of exciting current, to a power source line 14, while the remaining ends of the coils are connected to the collectors of transistors 15A and 16A adapted to selectively excite the coils 11A and 12A, respectively. The emitters of the transistors 15A and 16A are connected to one terminal of a current detecting resistor 17A, the other terminal of which is grounded, and to one input terminal of a comparator 19A through a voltage dividing circuit 18A. The other input terminal of the comparator 19A is connected to an input terminal 20A to which a reference voltage $V_{Ref}$ is applied.

The voltage dividing circuit is a series circuit of a first resistor 21A, a second resistor 22A and a switching transistor 23A. The resistors 21A and 22A have a relatively high resistance. The voltage developed at the connection point of the resistors 21A and 22A is compared with the reference voltage in the comparator 19A. When the transistor 23A in the circuit is non-conductive, a voltage $V_1$ is developed across the current detecting resistor 17A in proportion to the value of the exciting current, and the voltage thus developed is applied to the comparator as it is. When, on the other hand, the transistor 23A is conductive, the voltage $V_1$ is subjected to voltage division by the resistors 21A and 22A, as a result of which a voltage $V_2$, which is half of the voltage $V_1$, is applied to the comparator 19A.

The arrangement of circuit elements for exciting the B phase exciting coil 11B and $\overline{B}$ phase exciting coil 12B is similar to that of the above-described elements for exciting the coils 11A and 12A, and thus the preceding description is applicable, corresponding parts being given corresponding reference numerals.

Figure 4:
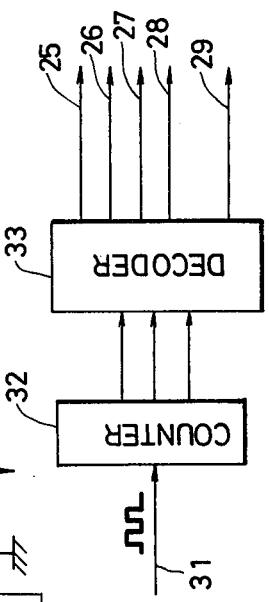
FIG. 4 is a block diagram of a control circuit for controlling each phase excitation.

In operation, control signals 25 through 29 are applied to the base of the transistors 15A, 16A, 15B, 16B, 23A and 23B, as indicated in FIG. 3. FIG. 4 shows a control circuit for forming the control signals 25 through 29. The control circuit comprises an octal counter 32 for counting a clock pulse 32 from a ROM (read-only-memory) (not shown); and a decoder for outputting the control signals 25 through 29 according to the count values of the counter 32. The waveforms of the controls signals 25 through 29, which are output by the decoder 33 in response to count values "0" through "7" of the counter 32, respectively, are as shown in parts (a) through (e) of FIG. 5, respectively. As is clear from FIG. 5, the control signals 25 through 28 applied respectively to the bases of the transistors 15A, 16A, 15B and 16B for phase excitation have waveforms whose phases are shifted by a quarter (¼) period from one another. That is, the control signals are so designed that, as the counting operation of the counter 32 is advanced, a state where two control signals are at the "H" (high) level and a state where only one control signal is at the "H" level occurs alternatingly. As the transistors 15A, 16A, 15B and 16B are rendered conductive when the control signals 25 through 28 are raised to the "H" level, the one-two phase excitation of the step motor is carried out using the control signals 25 through 28. The voltage level of the control signal 29, which is applied to the bases of the transistors 23A and 23B in the voltage dividing circuits 18A and 18B (FIG. 3) is changed whenever the content of the counter 32 is increased by one. In other words, the control signal 29 is raised to the "H" level when only one of the control signals 25 through 28 is raised to the "H" level, i.e., when one-phase excitation is carried out. When the control signal 29 is raised to the "H" level, the voltage dividing circuit 18A or 18B carries out its voltage dividing operation.

When the count value of the counter 32 which counts the clock pulse 31 reaches "0", the A phase control signal 25 and the $\overline{B}$ phase control signal 28 (parts (a) and (d) of FIG. 5) are at the "H" level, whereby the transistors 15A and 16B are rendered conductive. In this operation, the reference voltage $V_{Ref}$ is applied to the two comparators 19A and 19B. In this initial state, the reference voltage $V_{Ref}$ is higher than the voltage $V_1$ and the comparators 19A and 19B output comparison signals to render the chopper transistors 13A and 13B conductive, respectively. As a result, exciting currents start flowing in the A phase exciting coil 11A and the $\overline{B}$ phase exciting coil 12B through the power-source line 14. As the exciting currents increase according to a time constant, the voltages $V_1$ developed across the current detecting resistors 17A and 17B are increased transiently. When the voltages $V_1$ reach the reference voltage $V_{Ref}$, the comparators 19A and 19B stop outputting the comparison signals, so that the chopper transistors 13A and 13B are rendered non-conductive.

The reference voltage $V_{Ref}$ which is applied to the input terminals 20A and 20B of the comparators is formed by a reference voltage generating circuit as shown in FIG. 6. This device includes a saw tooth wave generator 34; a DC blocking capacitor 35 connected in series with the generator 34; and a constant voltage generator for superposing a DC voltage on the saw tooth wave provided through the capacitor 35 by the generator 34. Therefore, the reference voltage $V_{Ref}$ is periodically changed in level according to the saw tooth wave. Accordingly, the comparators 19A and 19B control the on-off operations of the chopper transistors 13A and 13B, and therefore the exciting currents are controlled in a constant current mode. While the A phase and the $\overline{B}$ phase are excited simultaneously, the rotor (not shown) carries out the step operation so that the polar teeth thereof are positioned between the polar teeth of the stator (not shown) which form the respective exciting phases.

When, in succession with this, the next clock pulse is provided by the ROM, the content of the counter 32 becomes "1", whereby, as shown in FIG. 5, only the voltage level of the $\overline{B}$ phase control signal 28 (part (d) of FIG. 5) is changed from the "H" level to the "L" level. At the same time, the voltage level of the control signal 29 is changed from the "L" level to the "H" level. As a result, the transistor 16B is rendered non-conductive, and the circuit operation for $\overline{B}$ phase excitation is suspended. On the other hand, the transistor 23A in the voltage dividing circuit 18A is rendered conductive, so that the voltage $V_2$ is applied to the comparator 19A. Since the voltage $V_2$ is half the voltage $V_1$, the comparator 19A controls the exciting current of the A phase exciting coil 11A with a current value two times the current value employed for control in the case of the voltage $V_1$. While one-phase excitation for the A phase only is carried out as described above, the rotor steps to a position where the polar teeth thereof confront with the polar teeth of the stator which are for the A phase excitation.

Similarly as in the above-described case, whenever the clock pulse is inputted with the predetermined period, the counting operation of the counter 32 is advanced, so that the step motor is driven successively. In this operation, excitation control is carried out similarly as in the above-described case, and the exciting currents 38A through 38D (parts (a) through (d) of FIG. 7) flowing in the exciting coils 11A, 12A, 11B and 12B are changed stepwise.

As is apparent from the above description, according to the invention, the torque in one-two phase excitation is made uniform. Accordingly, a smooth rotation characteristic can be obtained even in the low speed rotational range of the step motor, and therefore the vibration of the device using the step motor or the generation of noise therefrom can be sufficiently suppressed.

In the above-described embodiment, the value of the exciting current flowing in the exciting coil in one-phase excitation is set to two times the value of the exciting current flowing in each exciting coil with two-phase excitation. However, it goes without saying that the ratio of the values may be changed according to various conditions, such as for instance the load applied to the step motor. For example, in the case of a step motor used in a facsimile device whose load is a system for conveying a roll-type recording sheet, the ratio may be set in the range of from 1.5 to 2.5 to obtain a smooth rotation characteristic.

Furthermore, in the described embodiment, the reference voltage applied to the comparators was of the saw tooth wave type; however, the reference voltage may be of any periodic waveform.

What is claimed is:

1. A step motor excitation system comprising; a drive circuit including current detecting means for detecting an exciting current flowing in each exciting coil of said step motor, wherein said exciting current in said each exciting coil has a uniform wavelength and each exciting current is separated by one-quarter period from the other, constant current control means for controlling said exciting current detected by said current detecting means so as to have a predetermined current value, and current setting means for setting said predetermined current values in a one-phase excitation and in a two-phase excitation of said step motor so as to be different from one another, respectively, in correspondence to one-phase and two-phase excitations.

2. A system as claimed in claim 1, wherein said constant current control means comprises chopper transistor means.

3. A system as claimed in claim 2, wherein an on-off operation of said chopper is controlled by comparator means.

4. A system as claimed in claim 3, further including means for providing a periodically varying reference voltage as one input of said comparator means.

5. A system as claimed in claim 1, wherein said current setting means comprises voltage divider means.

6. A system as claimed in claim 4, wherein said current setting means comprises voltage divider means, an output of said voltage divider forming a second input of said comparator.

7. A system as claimed in claims 5 or 6, said voltage divider means comprising a series resistor circuit and a switching transistor for controlling a voltage dividing operation of said voltage divider means.

8. A system as claimed in claim 7, including means for controlling said switching transistor and the flow of current to said coils comprising counter means and decoder means.

9. A system as claimed in claim 8, said switching transistor being enabled by said decoder means to effect a voltage division operation by said voltage divider means during a one-phase excitation interval.

* * * * *